United States Patent
Ihns

(10) Patent No.: US 9,772,632 B1
(45) Date of Patent: Sep. 26, 2017

(54) BYPASS VALVE

(71) Applicant: Richard Michael Ihns, Orlando, FL (US)

(72) Inventor: Richard Michael Ihns, Orlando, FL (US)

( * ) Notice: Subject to any disclaimer, the term of this patent is extended or adjusted under 35 U.S.C. 154(b) by 278 days.

(21) Appl. No.: 14/551,413

(22) Filed: Nov. 24, 2014

Related U.S. Application Data

(60) Provisional application No. 61/908,523, filed on Nov. 25, 2013.

(51) Int. Cl.
*F01P 7/02* (2006.01)
*G05D 23/185* (2006.01)

(52) U.S. Cl.
CPC .................. *G05D 23/1852* (2013.01)

(58) Field of Classification Search
CPC ...... F01P 1/08; F01P 7/026; F01P 7/16; F01P 7/165; F01M 5/007; G05D 23/02; G05D 23/13; G05D 23/1333; G05D 23/1852; G05D 25/1353; F02B 37/183; F02B 37/186; F04B 2205/151; F25B 2600/2501
USPC ..................................................... 236/34.5
See application file for complete search history.

(56) References Cited

U.S. PATENT DOCUMENTS

| | | | |
|---|---|---|---|
| 2,754,062 A * | 7/1956 | Von Wangenheim | G05D 23/022 137/493 |
| 2,765,983 A * | 10/1956 | Mayo | G05D 23/123 137/494 |
| 2,837,285 A * | 6/1958 | Urban | G05D 16/10 236/34.5 |
| 2,859,768 A * | 11/1958 | Teague, Jr. | F04B 49/10 137/468 |
| 3,120,926 A * | 2/1964 | Gobien | G05D 23/1333 236/34.5 |
| 3,300,135 A * | 1/1967 | Slater | B64D 35/00 236/34.5 |
| 3,380,466 A * | 4/1968 | Sarra | G05D 23/12 123/41.09 |

(Continued)

FOREIGN PATENT DOCUMENTS

| | | | | |
|---|---|---|---|---|
| CN | WO 2013060202 A1 * | 5/2013 | ............... | F01P 7/16 |
| FR | 864269 A * | 4/1941 | ............... | F01M 1/12 |

(Continued)

*Primary Examiner* — Ljiljana Ciric
(74) *Attorney, Agent, or Firm* — H. John Rizvi; Gold & Rizvi

(57) ABSTRACT

A bypass valve for thermally regulating a fluid flow in two directions by opening and closing a bypass fluid flow between the two directions. An example of application of such a bypass valve is for regulating the flow of engine coolant fluid between a vehicle engine and a heat-exchange system for cooling down the engine coolant. The bypass valve includes a housing inside which a first port, a second port, a bypass port and a barrier assembly are arranged. The barrier assembly is movable with respect to the bypass port, so that it can open or close the port depending on fluid temperature. In addition, the barrier assembly is arranged external to the first and second ports, so that it does not interfere with fluid passing through them. The bypass valve therefore provides substantially constant fluid pressure in the first and second ports, avoiding pressure drops associated with conventional bypass valves.

22 Claims, 13 Drawing Sheets

(56) References Cited

U.S. PATENT DOCUMENTS

| | | | | |
|---|---|---|---|---|
| 3,404,837 A | * | 10/1968 | James | F16H 57/0413 236/34.5 |
| 3,554,440 A | * | 1/1971 | Austin | G05D 23/134 236/34.5 |
| 3,700,166 A | * | 10/1972 | Foults | F01P 7/16 123/41.54 |
| 3,754,706 A | | 8/1973 | Tao | |
| 3,913,831 A | * | 10/1975 | Talak | F01M 5/007 137/625.29 |
| 3,939,807 A | * | 2/1976 | Eichinger | F01P 3/202 123/41.02 |
| 3,948,440 A | * | 4/1976 | Wagner | F01P 7/16 236/34.5 |
| 3,973,729 A | * | 8/1976 | Sliger | G05D 23/1333 137/533.11 |
| 4,011,988 A | * | 3/1977 | Inagaki | F01P 7/16 123/41.02 |
| 4,022,377 A | * | 5/1977 | Wagner | G05D 23/1333 236/34.5 |
| 4,024,909 A | * | 5/1977 | Hofmann, Jr. | G05D 23/1333 165/297 |
| 4,027,643 A | | 6/1977 | Feeman et al. | |
| 4,190,198 A | * | 2/1980 | Casuga | F01M 5/007 236/34.5 |
| 4,270,562 A | | 6/1981 | Oberth et al. | |
| 4,314,664 A | * | 2/1982 | Wisyanski | G05D 23/1333 236/34.5 |
| 4,666,081 A | * | 5/1987 | Cook | F01P 7/167 236/34.5 |
| 4,674,679 A | * | 6/1987 | Saur | F01P 7/167 236/34.5 |
| 4,679,530 A | * | 7/1987 | Kuze | F01P 7/16 123/41.1 |
| 4,748,941 A | * | 6/1988 | Kashiwase | F01P 7/16 123/41.1 |
| 4,856,711 A | * | 8/1989 | Grinsteiner | G05D 23/1333 236/34.5 |
| 4,883,225 A | * | 11/1989 | Kitchens | F01P 7/16 137/73 |
| 4,981,260 A | * | 1/1991 | Beiser | F01P 11/16 137/74 |
| 5,083,705 A | * | 1/1992 | Kuze | G05D 23/134 236/34.5 |
| 5,188,287 A | * | 2/1993 | Chamot | F01P 7/16 236/34.5 |
| 5,228,618 A | * | 7/1993 | Afshar | F24H 9/2035 236/34.5 |
| 5,275,231 A | * | 1/1994 | Kuze | G05D 23/1333 123/41.1 |
| 5,333,454 A | * | 8/1994 | Nikaido | B62D 6/02 137/115.09 |
| 5,381,952 A | * | 1/1995 | Duprez | F01P 11/16 236/34.5 |
| 5,385,296 A | * | 1/1995 | Kurz | G05D 23/1393 236/34.5 |
| 5,467,745 A | * | 11/1995 | Hollis | F01P 7/167 123/41.1 |
| 5,669,363 A | * | 9/1997 | Francis | F01P 7/026 123/563 |
| 5,727,729 A | * | 3/1998 | Hutchins | G05D 23/1333 123/41.1 |
| 5,755,283 A | * | 5/1998 | Yates | F24D 3/18 165/297 |
| 5,775,270 A | * | 7/1998 | Huemer | F01P 7/16 123/41.1 |
| 5,791,557 A | * | 8/1998 | Kunze | G05D 23/022 236/34.5 |
| 5,803,356 A | * | 9/1998 | Babinger | F01P 11/16 137/219 |
| 5,904,292 A | | 5/1999 | McIntosh | |
| 5,934,552 A | * | 8/1999 | Kalbacher | G05D 23/022 236/12.2 |
| 5,979,778 A | * | 11/1999 | Saur | F01P 7/16 236/34.5 |
| 5,992,755 A | * | 11/1999 | Kuze | G05D 23/1333 236/34.5 |
| 6,138,617 A | * | 10/2000 | Kuze | F01P 7/16 123/41.1 |
| 6,343,746 B2 | * | 2/2002 | Chamot | G05D 23/1393 236/34.5 |
| 6,357,666 B1 | * | 3/2002 | Fukamachi | F01P 7/16 137/315.11 |
| 6,457,652 B1 | * | 10/2002 | Fukamachi | F01P 7/16 236/34.5 |
| 6,499,666 B1 | | 12/2002 | Brown | |
| 6,575,707 B2 | * | 6/2003 | Matt | F04B 41/00 165/297 |
| 6,592,046 B2 | * | 7/2003 | Suda | F01P 7/167 236/34.5 |
| 6,648,018 B2 | | 11/2003 | Gagnon | |
| 6,695,217 B2 | * | 2/2004 | Leu | G05D 23/1393 236/34.5 |
| 6,719,208 B2 | * | 4/2004 | Brown | F01M 5/007 236/34.5 |
| 6,820,817 B2 | * | 11/2004 | Leu | F01P 7/167 236/100 |
| 6,863,221 B2 | * | 3/2005 | Colas | F01P 7/167 236/34.5 |
| 6,915,958 B2 | * | 7/2005 | Colas | F01P 7/167 236/34.5 |
| 6,929,189 B2 | * | 8/2005 | Takei | F01P 7/16 236/34.5 |
| 6,935,569 B2 | * | 8/2005 | Brown | F01M 5/007 236/34.5 |
| 7,172,135 B2 | * | 2/2007 | Masuko | F01P 7/16 123/41.08 |
| 7,299,994 B2 | * | 11/2007 | Brown | F01M 5/007 236/34.5 |
| 7,445,161 B2 | * | 11/2008 | Inoue | F01P 7/16 236/101 C |
| 7,487,826 B2 | * | 2/2009 | Pineo | F01M 5/00 165/103 |
| 7,490,581 B2 | | 2/2009 | Fishman | |
| 7,490,662 B2 | * | 2/2009 | Eliades | F28F 27/02 123/41.1 |
| 7,721,973 B2 | * | 5/2010 | Peric | F01P 7/14 137/625.49 |
| 7,735,546 B2 | * | 6/2010 | Bird | F01M 5/005 165/297 |
| 7,770,547 B2 | * | 8/2010 | Komurian | F01P 7/16 123/41.08 |
| 7,819,332 B2 | * | 10/2010 | Martin | F01M 5/007 236/101 A |
| 7,854,256 B2 | | 12/2010 | Pineo et al. | |
| 8,020,782 B2 | | 9/2011 | Moser et al. | |
| 8,042,745 B2 | * | 10/2011 | Iwasaki | F16K 31/002 236/100 |
| 8,141,790 B2 | * | 3/2012 | Sheppard | F01P 7/16 236/100 |
| 8,186,604 B2 | * | 5/2012 | Park | F01P 7/16 236/34.5 |
| 8,893,979 B2 | * | 11/2014 | Kusakabe | G05D 23/022 236/100 |
| 8,960,562 B2 | * | 2/2015 | Neelakantan | F16H 57/0413 236/101 A |
| 8,973,537 B2 | * | 3/2015 | Lee | F01P 7/16 123/41.29 |
| 2006/0108435 A1 | * | 5/2006 | Kozdras | G05D 23/1333 236/93 R |
| 2007/0131783 A1 | * | 6/2007 | Kempf | E03B 1/048 236/12.1 |
| 2008/0093066 A1 | * | 4/2008 | Bird | F01M 5/005 165/297 |
| 2008/0216775 A1 | * | 9/2008 | Repple | F01P 5/10 123/41.1 |
| 2009/0026405 A1 | * | 1/2009 | Sheppard | F16K 15/06 251/364 |

(56) References Cited

U.S. PATENT DOCUMENTS

| | | | |
|---|---|---|---|
| 2009/0108223 A1* | 4/2009 | Deutsch | F16K 11/0743 251/284 |
| 2010/0175640 A1* | 7/2010 | Sheppard | F01P 7/16 123/41.09 |
| 2011/0005741 A1 | 1/2011 | Sheppard | |
| 2011/0132989 A1* | 6/2011 | Kempf | E03B 7/045 236/12.11 |
| 2013/0319634 A1* | 12/2013 | Sheppard | F28F 27/00 165/96 |

FOREIGN PATENT DOCUMENTS

| | | | | |
|---|---|---|---|---|
| SE | WO 2013151486 A1 * | 10/2013 | | F16K 11/044 |
| WO | WO 2012109372 A1 * | 8/2012 | | G05D 23/022 |

* cited by examiner

BYPASS VALVE

CROSS-REFERENCE TO RELATED APPLICATIONS

This application claims the benefit of U.S. Provisional Patent Application Ser. No. 61/908,523, filed Nov. 25, 2013, which is incorporated herein in its entirety.

FIELD OF THE INVENTION

The present invention relates to a bypass valve of the kind that includes a first port and a second port for passage of fluid, and a bypass port communicating the first and second ports, wherein the bypass port is opened or closed by a barrier assembly that does not interfere with the first and second ports, thus minimizing pressure drops in fluid passing through the first and second ports and permitting a higher flow rate through the ports at a given pressure.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

A valve is a device that regulates, directs or controls the flow of a fluid by opening, closing, or partially obstructing various passageways. Many kinds of valves are known in the art, depending on the kind of flow control to be performed, the kind of fluid they are to control, and/or other diverse technical factors.

Bypass valves, in particular, are valves that allow fluid to normally pass through one or more ports, and that open to direct fluid in an alternate direction after a set temperature, pressure, or voltage limit is reached. When the predetermined unit is exceeded, bypass valves allow the fluid to flow through a bypass port in the alternate direction. In this manner, bypass valves allow regulating parameters of a fluid.

An example of use of bypass valves is found in internal combustion engine cooling systems, whose purpose is to cool down a coolant fluid after the fluid has been in turn used to cool down the internal combustion engine and has thus become heated. Generally, the coolant fluid is cooled in a heat exchange system in which the engine coolant flows through a radiator; the engine coolant exchanges heat with cooler air adjacent to the radiator, and thus becomes cooled. However, in the event that the coolant fluid is not hot enough, a bypass valve bypasses the coolant fluid flow coming from the engine so that it flows back to the engine instead of to the heat exchange system; when coolant fluid is heated over a predefined threshold temperature, the bypass valve switches so that the coolant fluid is directed towards the heat exchange system. Fluid flow switching inside the bypass valve is carried out by a movable barrier assembly that is capable of opening and closing a bypass port communicating the different ports through which fluid flows to and from the heat exchange system. Even though bypass valves are very useful for internal combustion engine cooling systems and other applicable systems, they are not free of certain drawbacks. For example, bypass valves are known to create pressure drops in the fluid flowing from the engine towards the heat exchange system, and/or in the opposite direction.

Accordingly, there remains a need in the art for a bypass valve that provides a constant pressure of the fluid entering and exiting the valve while maintaining reasonably compact external dimensions.

SUMMARY OF THE INVENTION

The present invention overcomes the deficiencies of the known art and the problems that remain unsolved by providing a bypass valve having two fluid passage ports, a bypass port communicating them, and a barrier assembly capable of opening and closing the bypass port, where the barrier assembly is arranged not to invade the fluid passage ports. In this configuration, the barrier assembly engages and regulates the fluid in the bypass port, while avoiding direct contact with the first port, the second port, or the fluid in either port. This novel configuration improves fluid flow through the first and second ports at a given pressure, and inhibits undesirable pressure drops and flow restrictions caused by viscous forces on the barrier assembly.

In accordance with one embodiment of the present invention, the invention consists of a bypass valve for thermally regulating a fluid flow, the bypass valve comprising:
   a first port, configured to at least partially enable a fluid to pass through the valve in a first direction,
   a second port, configured to at least partially enable the fluid to pass through the valve in a second direction,
   a bypass port, arranged to extend between the first port and the second port for providing fluid communication between the first port and the second port;
   a barrier assembly, adapted to move between an open position and a closed position in response to a variance in the fluid temperature; wherein
   in the open position, the barrier assembly allows fluid to flow through the bypass port, whereas in the closed position the barrier assembly at least partially inhibits fluid flow through the bypass port; and wherein
   the barrier assembly is movably arranged externally to the first port and second port.

In another aspect, the barrier assembly extends in a substantially perpendicular orientation with respect to the bypass port, moving between the open position and the closed position.

In another aspect, the first port and second port are substantially parallel.

In another aspect, the barrier assembly is movable in a direction that is substantially parallel to the first direction and the second direction.

In another aspect, the barrier assembly comprises a linear thermal actuator element, a barrier affixed to the thermal actuator element, and a spring bearing upon the thermal actuator element and biasing the thermal actuator element towards the open position, said thermal actuator element being responsive to the fluid temperature for regulating the flow through the bypass port. The linear thermal actuator element is capable of causing the barrier to move from the open position to the closed position in dependence to the temperature of the fluid. The spring is biased to push the barrier assembly outward of the bypass port and towards the open position.

In another aspect, the barrier assembly includes a barrier that is adapted to move from the open position to the closed position in direct relation to the temperature of the fluid, wherein the barrier is operated by an electric motor, a solenoid, a pneumatic system, a hydraulic system, a manual force, and/or other mechanical or electric actuator, in dependence of the change of fluid temperature.

In another aspect, the movable barrier assembly includes at least one conduit allowing fluid to pass through from the bypass port to a separate space, separated from the first port and the second port.

In another aspect, the barrier assembly is arranged at least partially in the separate space, the at least one conduit extending between a first end surface of the barrier assembly that faces the separate space, and a second end surface of the barrier assembly that is opposite to the first end surface, wherein the second end surface is arranged so that the second end surface is inside the bypass port when the valve is in an open position, and outside the bypass port when the valve is in the closed position.

In another aspect, the barrier assembly includes an end surface that is in contact with fluid passing through the bypass port when the bypass valve is in the open position, said end surface being capable of sensing fluid temperature changes.

In another aspect, the linear thermal actuator element is arranged extending through the barrier so that an end surface of the linear thermal actuator element is in contact with fluid passing through the bypass port when the bypass valve is in the open position, said end surface being capable of sensing fluid temperature changes.

In another aspect, the bypass valve includes a housing in which the first port, second port, and bypass port are comprised. The housing may be manufactured from metal, composite material and/or any other applicable material.

In another aspect, the separate space is also comprised inside the housing.

In a further aspect, the bypass port defines a bypass inlet at the first port and a bypass outlet at the second port wherein the bypass inlet has a cross-sectional area greater than the bypass outlet.

In still a further aspect, when the bypass valve is in a closed position the barrier blocks the bypass outlet to prevent fluid flow therethrough and only partially blocks the bypass inlet.

Introducing another embodiment of the invention, the present invention consists of a bypass valve for thermally regulating fluid flow, which includes a housing defining a first port for the passage of a fluid in a first direction, defining a second port laterally disposed from the first port for the passage of a fluid in a second direction, defining a bypass chamber isolated from the first port and the second port, and defining a bypass port extending from said first port, through said bypass chamber to said second port. A barrier assembly is disposed in the bypass chamber and includes a barrier affixed thereto and is operably configured to translate the barrier between an open position and a closed position in response to a temperature change of the fluid. When the barrier assembly is in an open position fluid flow is permitted between the first port and the second port through the bypass port, and when the barrier assembly is in a closed position the barrier assembly blocks fluid flow through the bypass port.

In a second aspect, the housing comprises a first housing affixed to a second housing and includes an O-ring disposed therebetween.

In another aspect, the barrier assembly further includes a spring biasing the barrier assembly in the open position.

In still a further aspect, the biasing spring is a compression spring.

In another aspect, the barrier assembly further comprises a linear thermal actuator element having a sensor surface and is responsive to a temperature change of a fluid in contact with the sensor surface for actuating the barrier assembly to a closed position, and further wherein the barrier is disposed about the linear thermal actuator element.

In yet another aspect, the bypass port defines a bypass inlet at the first port and a bypass outlet at the second port wherein the bypass inlet has a cross sectional area greater than the bypass outlet.

In still another aspect, when the bypass valve is in the closed position the barrier blocks the bypass outlet to prevent fluid flow therethrough and only partially blocks the bypass inlet.

Introducing yet another embodiment of the invention, the present invention consists of a bypass valve for thermally regulating a fluid flow, including a housing defining a first port for the passage of a fluid in a first direction, defining a second port laterally disposed from the first port for the passage of a fluid in a second direction, defining a bypass chamber isolated from the first port and the second port, and defining a bypass port extending from said first port, through said bypass chamber to said second port. A barrier assembly is disposed in the bypass chamber and includes a linear thermal actuator element having a sensor surface and is responsive to a temperature change of a fluid in contact with the sensor surface for actuating the barrier assembly to a closed position. A biasing spring biases the barrier assembly to an open position, and a barrier is affixed to the linear thermal actuator element and is operably configured to translate between an open position and a closed position in response to a temperature change of the fluid. The barrier assembly when in the open position permits fluid flow between the first port and the second port through the bypass port, and when in the closed position blocks fluid flow through the bypass port.

In a second aspect, the bypass port defines a bypass inlet at the first port and a bypass outlet at the second port wherein the bypass inlet has a cross-sectional area greater than the bypass outlet and further wherein when the bypass valve is in the closed position the barrier blocks the bypass outlet to prevent fluid flow therethrough and only partially blocks the bypass inlet.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
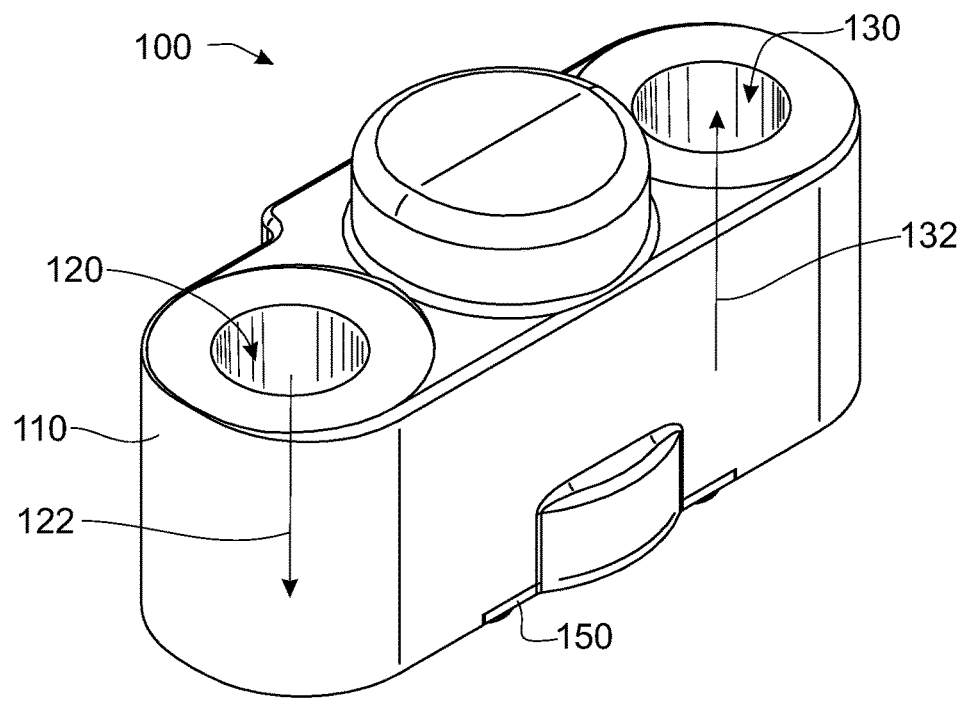
FIG. 1 presents a detailed perspective view of an exemplary bypass valve according to the invention, viewed from a top angle.
Figure 2:
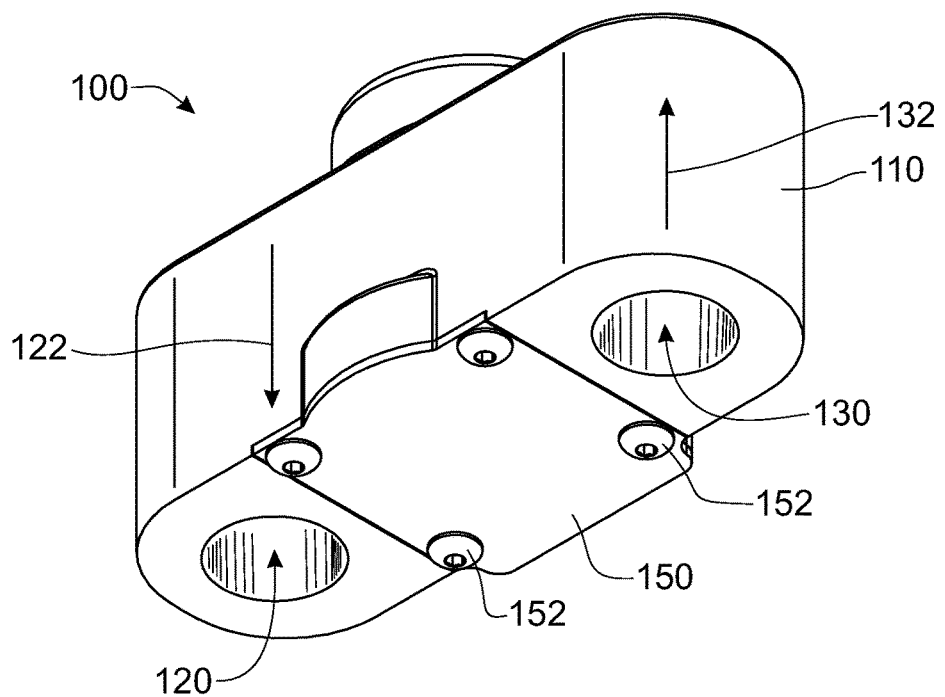
FIG. 2 presents another detailed perspective view of the bypass valve of FIG. 1, viewed from a bottom angle.

The illustrations of FIGS. 1 and 2 present a first embodiment of a bypass valve according to the invention, shown from a top angle and a bottom angle respectively. The bypass valve 100 comprises a housing 110, in which a first port 120 and a second port 130 are formed, whose purpose is to provide passageways for fluid to flow through the bypass valve 100. The fluid may include, without limitation, engine oil, a radiator coolant, a liquid, a gas, a vapor, a fluidized solid, and a slurry. The first port 120 can, for instance, allow engine coolant to pass from a vehicle engine towards a heat exchange cooling system, and the second port 130 can allow the engine coolant to return from the heat exchange cooling system towards the vehicle engine. In the embodiment shown in the figures, the first and second ports 120, 130 are parallel through-holes comprised in the housing 110. The first port 120 is configured to at least partially enable a fluid to flow in a first direction 122. The second port 130 is configured to at least partially enable the fluid to flow in a second direction 132. A bypass port 140, not shown in the figures, is arranged inside the housing 110 and extending between the first port 120 and the second port 130 for providing fluid communication between the first port 120 and the second port 130. The housing 110 may be manufactured from metal, composite material and/or any other applicable material. The bypass valve 100 further comprises a closure 150 to close the lower area of the housing 110 so that internal components of the bypass valve 100, which will be explained in further figures, are secured inside the housing 110. The closure 150 is attached to the housing 110 by any applicable means such as a magnet, a mechanical fastener, adhesive, etc. In the depicted embodiment, for instance, several screws 152 are used to secure the closure 150 to the housing 110. To prevent leakage of fluid from the mating surfaces of the housing 110 and the closure 150, an O-ring 154 (shown in FIGS. 3, 4, 7 and 8) is seated between the housing 110 and the closure 150.

Figure 3:
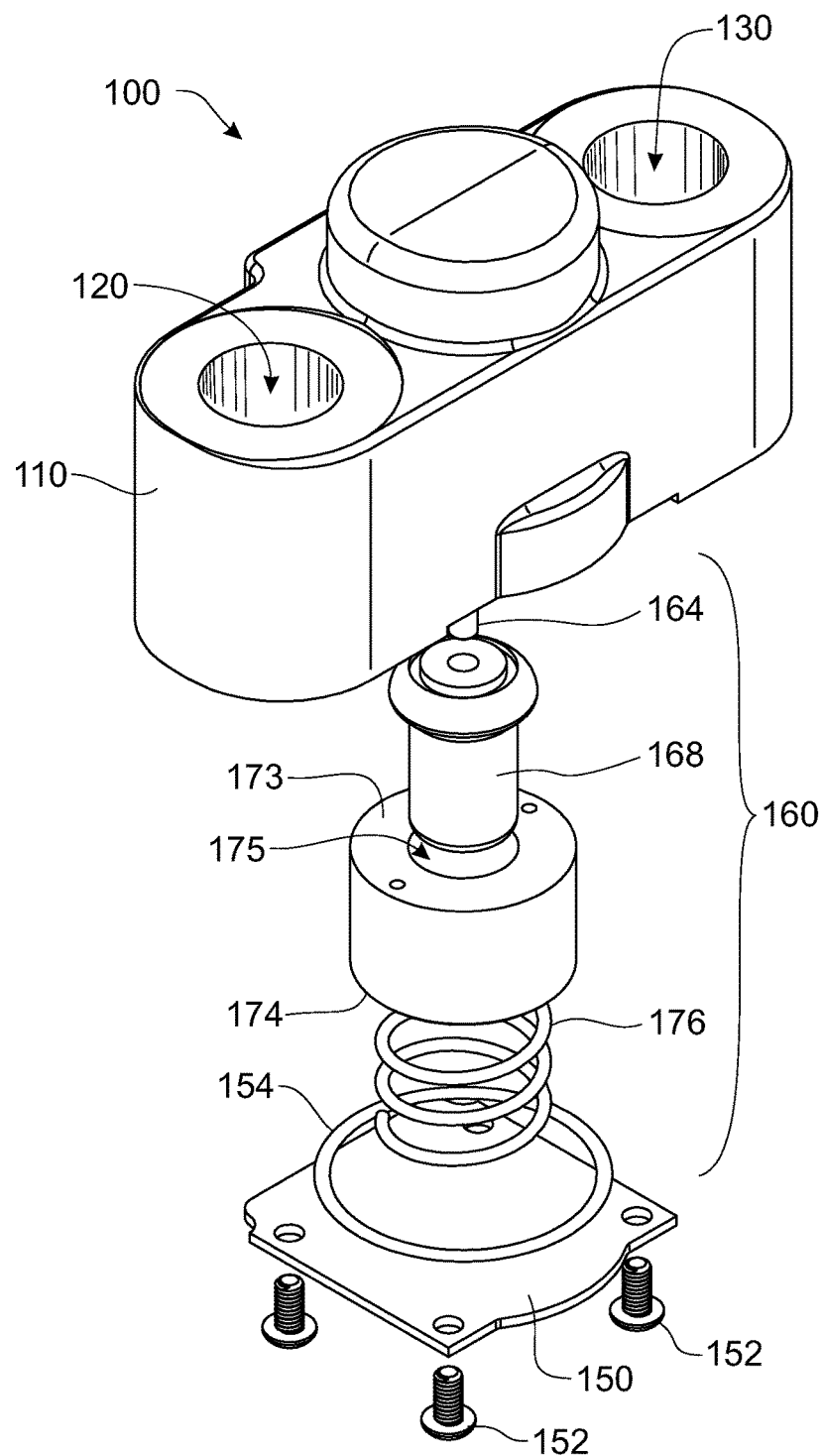
FIG. 3 presents an exploded view of the bypass valve of FIG. 1, viewed from a top angle.
Figure 4:
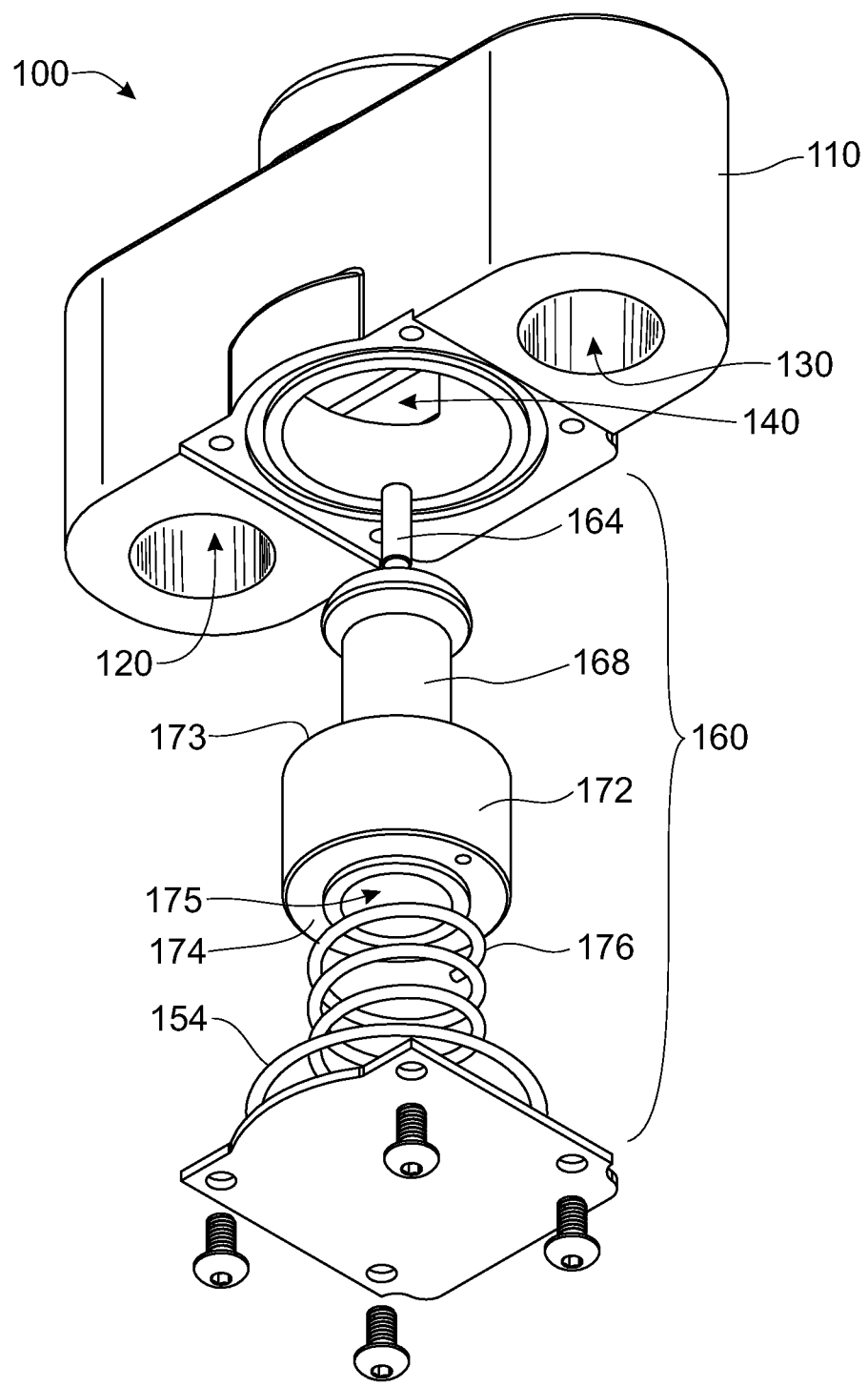
FIG. 4 presents an exploded view of the bypass valve of FIG. 1, viewed from a bottom angle.

The drawings of FIGS. 3 and 4 show exploded views of the bypass valve 100 of FIG. 1. As shown, the bypass valve 100 further comprises a barrier assembly 160, which in the present embodiment comprises an actuator pin 164, a linear thermal actuator element 168, a barrier 172, and a spring 176 that join together to regulate flow through the bypass port 140, slightly shown in FIG. 4. The barrier 172 of the present embodiment is in shape of a sleeve, comprising a first end surface 173, an opposed second end surface 174 and a through hole 175 inside which the linear thermal actuator element 168 is partially arranged. The linear actuator element 168 is adapted to cause the barrier 172 to move in response to a change in fluid temperature, as will be shown in further figures. Specifically, the linear actuator element 168 of the present embodiment contains a paraffin wax formulated to expand when it reaches a specific temperature; the expansion of the wax causes an internal diaphragm to expand, pushing the actuator pin 164 outward, and thus generating a relative linear motion between the actuator pin 164 and the linear thermal actuator element 168; as the wax cools, the diaphragm contracts, and the actuator pin 164 is allowed to retract towards the linear actuator element 168. Alternatively, the linear thermal actuator element 168 may include, without limitation, a metal alloy or other a thermal element. The spring 176 is biased to create an opposite force to the linear thermal actuator element 168, i.e., a vertically upward force according to the position of the bypass valve 100 in the figures.

Figure 5:
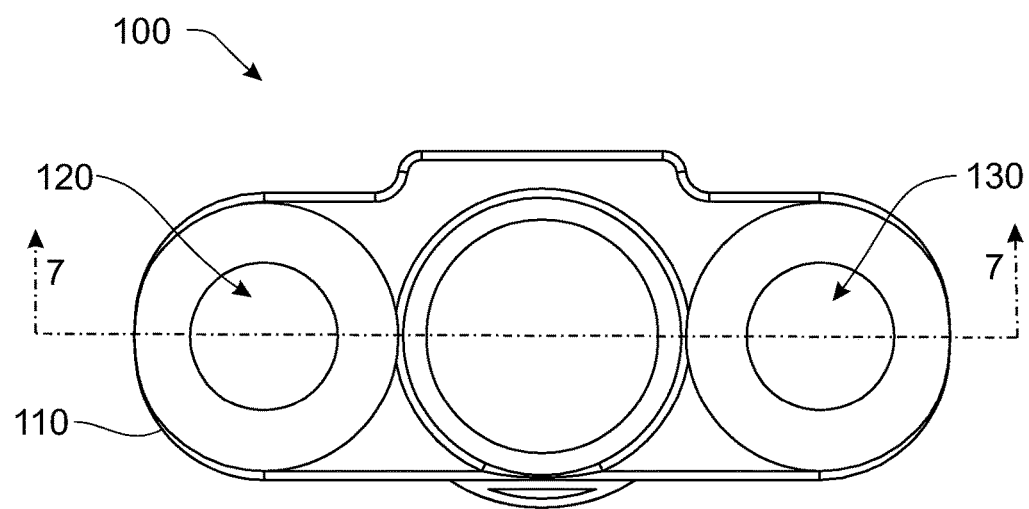
FIG. 5 presents a top view of the bypass valve of FIG. 1.
Figure 6:
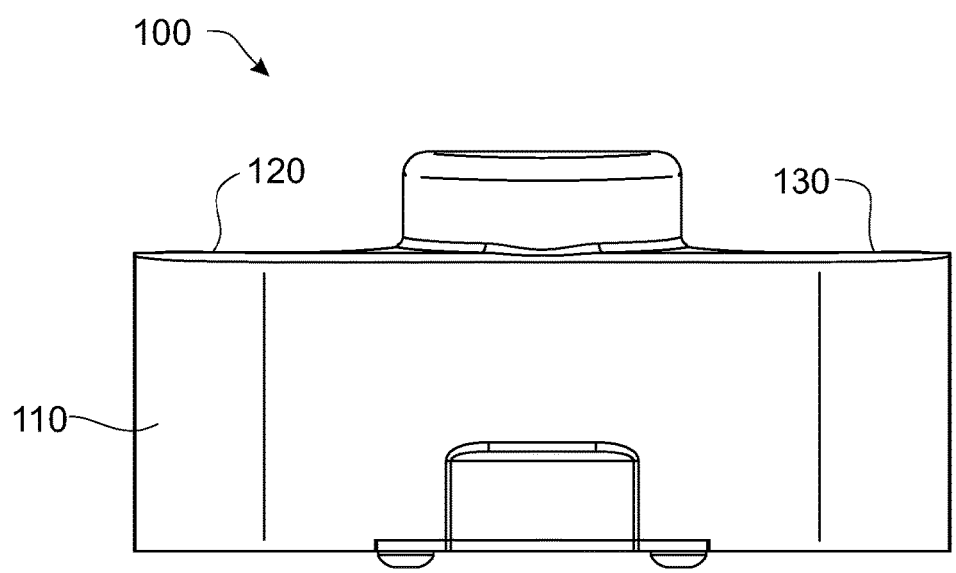
FIG. 6 presents a front view of the bypass valve of FIG. 1.

The illustrations of FIGS. 5 and 6 present further top and front views of the bypass valve 100 of FIG. 1, allowing to observe the valve from different angles to those provided by the previous figures. Again, the parallel and spaced-apart arrangement of the first and second ports 120, 130 of the present embodiment is observed, as well as the housing 110 of the bypass valve 100 being substantially rectangular in shape and arranged perpendicularly to the first and second ports 120, 130. Such a perpendicular arrangement provides a compact solution where the components of the valve according to the invention are most integrated.

Figure 7:
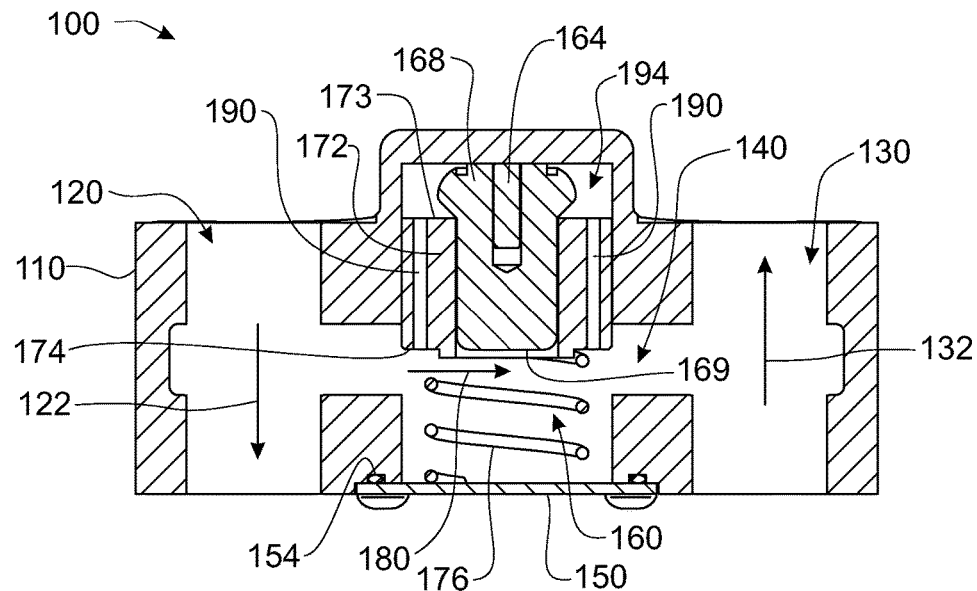
FIG. 7 presents a cross-sectional view of the bypass valve of FIG. 1, according to sectional plane 7-7 indicated in FIG. 5, the bypass valve being shown in an open position.
Figure 8:
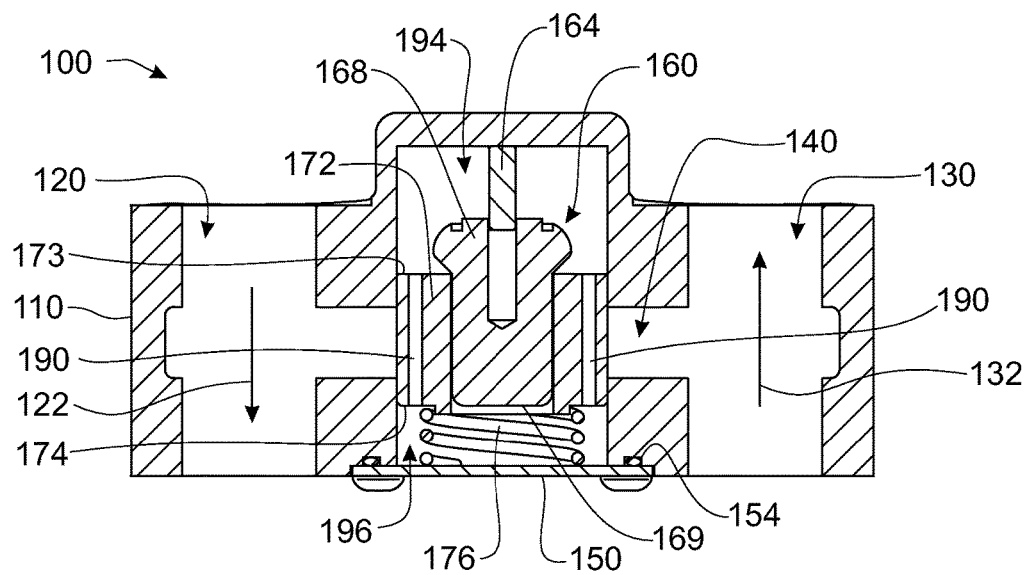
FIG. 8 presents the bypass valve of FIG. 7 in a closed position.

The drawing of FIG. 7 shows a cross-sectional view of the bypass valve 100 of FIG. 1, where the cross section has been performed according to sectional plane 7-7 shown in FIG. 5. The cross-sectional view makes it possible to fully observe the bypass port 140 according to the invention, arranged to extend between the first port 120 and the second port 130 for providing fluid communication between the first port 120 and the second port 130. In the embodiment shown, the bypass port 140 is perpendicular to the parallel first and second ports 120, 130, to minimize the length of the bypass port 140 and the size of the bypass valve 100. In the present illustration, the bypass valve 100 is shown in an open position in which the barrier assembly 160 allows the fluid to flow through the bypass port 140 as indicated by arrow 180. This open position has been reached because the fluid temperature is not high enough for the linear thermal actuator element 168 to actuate, and the barrier 172 is thus biased by the spring 176 in a vertically upward direction according to the position in the figure and kept from closing the bypass port 140. In the event that fluid temperature begins to increase, the linear thermal actuator element 168 starts applying an expansion force on the actuator pin 164 in a vertically upward direction according to the position of the figure. Because the actuator pin 164 is longitudinally fixed against an inner wall of the housing 110, the reaction force pushes the linear thermal actuator element 168 downwards, towards the bypass port 140, said reaction force counteracting the vertically upward force exerted by the spring 176. If temperature continues increasing, the reaction force eventually overcomes the spring force and causes the barrier 172 to move towards the bypass port 140. The illustration of FIG. 8 shows the bypass valve 100 in a closed position, in which fluid temperature has increased enough for the barrier 172 to fully block the bypass port 140 and thus inhibit fluid flow through the bypass port 140. As shown in the figures, the closure 150 provides an end stop to the barrier assembly 160 so that the spring 176 and linear thermal actuator element 168 can correctly exert their opposite forces.

According to the invention, the barrier assembly 160 is movably arranged externally to the first port 120 and the second port 130. In other words, as can be observed in FIGS. 7 and 8, the barrier assembly 160 engages the fluid solely in the bypass port 140 while avoiding direct contact with the fluid in the first port 120 and the second port 130, whether it be in the open position or in the closed position. Thus, the first and second ports 120, 130 are unaffected by the operation of the bypass valve 100 according to the invention. This novel positioning of the barrier assembly 160 outside of the first and second ports 120, 130 minimizes the surface area in contact with the fluid flowing through the first and second ports 120, 130, and thus results in a reduction of viscous forces opposing fluid flow. In addition, having the barrier assembly 160 outside of the first and second ports 120, 130 reduces debris accumulation, turbulences or other undesired effects inside the first and/or second ports 120, 130 during operation of the valve. Fluid can permanently and cleanly flow through the first and second ports 120, 130 unaffected, showing minimal pressure drops caused by the bypass valve 100.

Preferably, as shown, the barrier assembly 160 arranges perpendicularly in relation to the bypass port 140, movable between the open position and the closed position, allowing for an optimum placement of the barrier assembly 160 and to increase the compactness of the bypass valve 100, especially in the event that the first and second ports 120, 130 are parallel, as is the case of the present embodiment.

As shown in FIGS. 7 and 8, the movable barrier assembly 160 may further include at least one conduit 190—two, in the present embodiment—for allowing fluid to pass through from the bypass port 140 to a separate space 194, separated from the first port 120 and the second port 130. The barrier assembly 160 is movably arranged between the bypass port 140 and the separate space 194, and the conduits 190 allow relieving pressure differentials between the bypass port 140 and the separate space 194 that could affect operation of the valve.

In the depicted embodiment, the conduits 190 are comprised in the barrier 172, and the linear thermal actuator element 168 is arranged partially in the separate space 194. The first end surface 173 of the barrier 172 faces the separate space 194. In turn, the second end surface 174 is arranged so that it is inside the bypass port 140 when the valve is in an open position, as shown in FIG. 7, and outside the bypass port 140 when the valve is in the closed position, as shown in FIG. 8. Such an arrangement allows fluid to pass between the bypass port 140 and the separate space 194 when the barrier assembly 160 is moving, so that pressures in both spaces 140, 194 can equalize. In turn, having the second end surface 174 arranged outside the bypass port 140 when the valve is in the closed position guarantees that fluid does not pass from the first port 120 to the second port 130 or vice versa. Also, in the embodiment shown, when the valve is in the closed position, the barrier assembly 160 delimits an enclosed spring space 196, and the second end surface 174 is arranged facing said spring space 196 so that the conduits 190 communicate the spring space 196 with the separate space 194 and again relieve pressure differentials between the spaces 194, 196 so that the barrier assembly 160 can better operate back to the open position.

In the embodiment shown, the linear thermal actuator element 168 is arranged inside the sleeve-shaped barrier 172 so that an end surface 169 of the linear actuator element 168 is in contact with the fluid passing through the bypass port 140 when the bypass valve 100 is in the open position, as shown in FIG. 7. The linear actuator element 168 is adapted to actuate depending on the fluid temperature sensed on this end surface 169. Thus, the linear thermal actuator element 168 is capable of responding to fluid temperature changes when the bypass valve 100 is in the open position. Further, once the valve is closed as shown in FIG. 8, the linear thermal actuator element 168 is kept at near the temperature of the fluid flowing through first and second ports 120, 130 because the barrier 172 arranged around the linear thermal actuator element 168 is in contact with that fluid and thus conducts heat to the linear thermal actuator element 168. Once the fluid flowing through the first and second ports 120, 130 is substantially cooled, the temperature of the barrier 172 is cooled as well, and thus the linear thermal actuator element 168 begins to contract and the spring 176 forces the barrier 172 open again.

Figure 9:
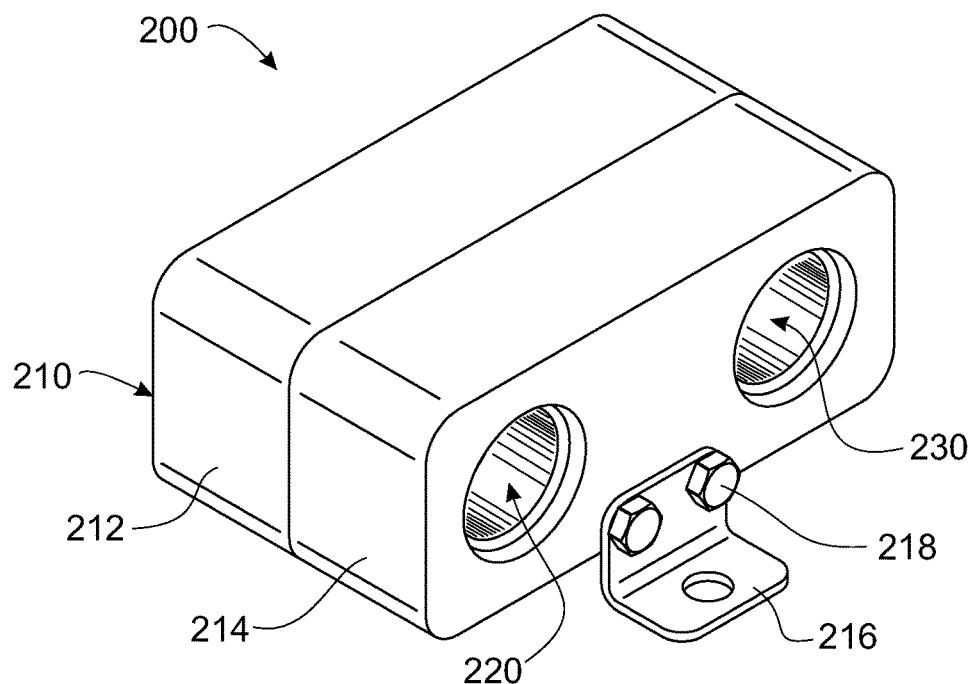
FIG. 9 presents a detailed perspective view of a second exemplary embodiment of a bypass valve according to the invention, shown from a top right angle.
Figure 10:
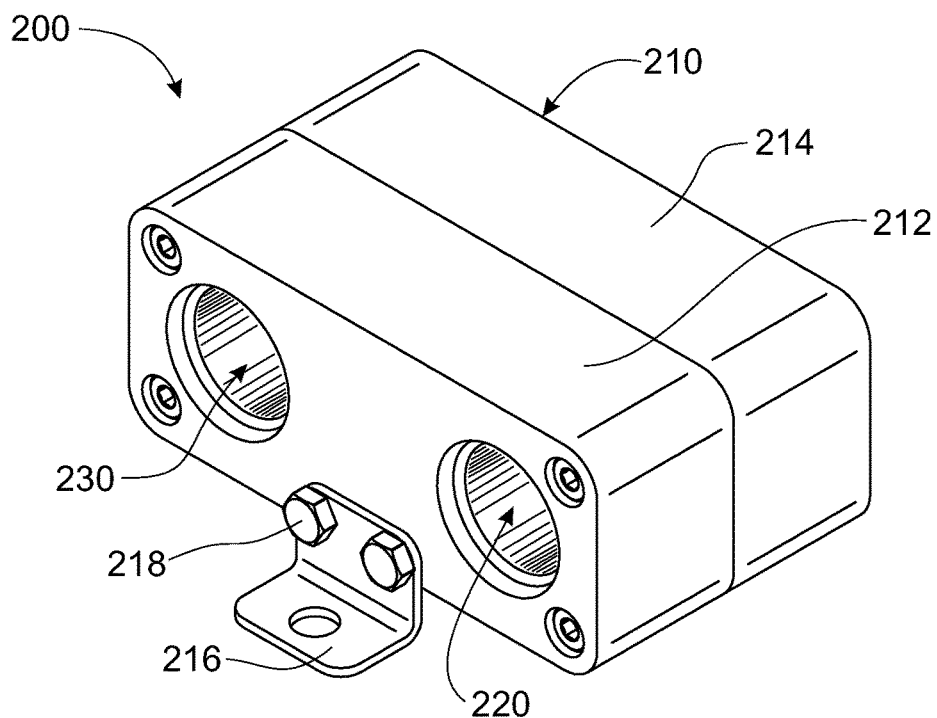
FIG. 10 presents a detailed perspective view of the bypass valve of FIG. 9, shown from a top left angle.
Figure 11:
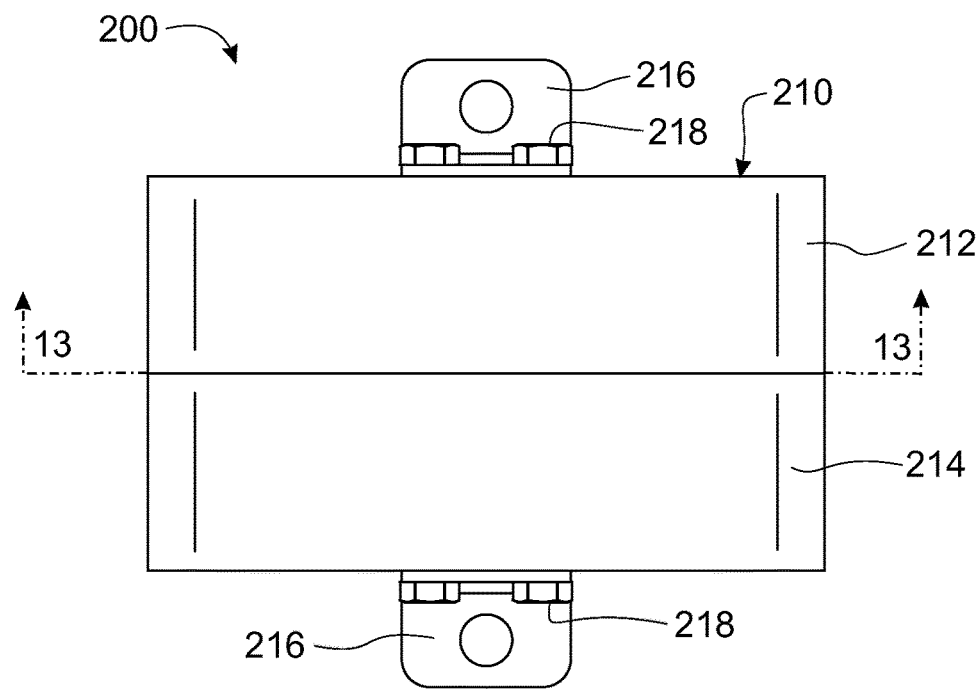
FIG. 11 presents a top view of the bypass valve of FIG. 9.
Figure 12:
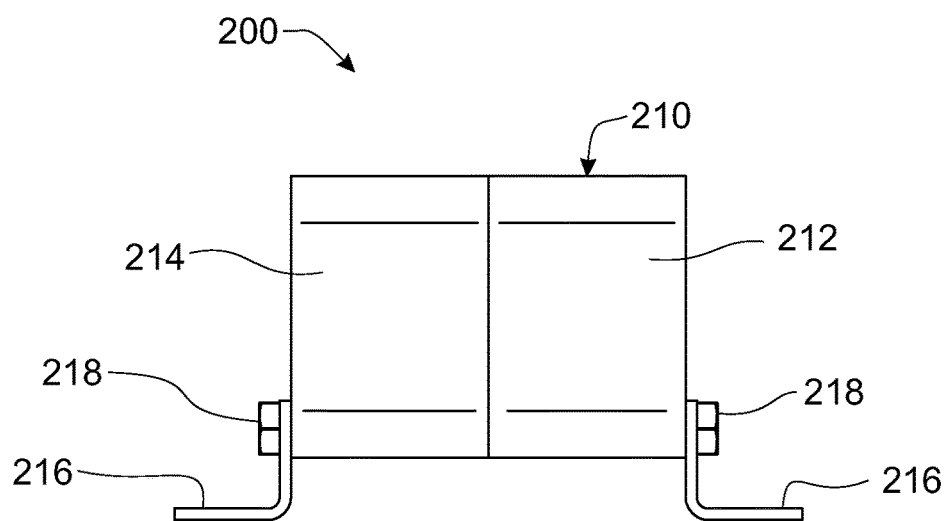
FIG. 12 presents a left side view of the bypass valve of FIG. 9.

The illustrations of FIGS. 9 and 10 present two detailed perspectives views of a second embodiment of the bypass valve according to the invention, shown from a from a top right angle and a top left angle respectively. The bypass valve 200 is again formed mainly inside a housing 210. In the present embodiment, however, the housing 210 is divided into a first portion 212 and a second portion 214. To prevent leakage of fluid from the mating surfaces of the first portion 212 and the second portion 214, an O-ring 215 (shown in FIGS. 13 and 14) is seated between the first portion 212 and the second portion 214. The bypass valve 200 according to the present embodiment also includes a first port 220 and a second port 230, similar to the previous embodiment of FIGS. 1 through 8. The drawings of FIGS. 11 and 12, in turn, respectively present a top view and an elevated side view of the bypass valve 200 of FIG. 9. As shown, this second embodiment does not include a cover for concealing and securing internal components of the valve; instead, internal components are inserted and secured inside the housing 210 by separating and joining the first and second portions 212, 214 of the housing 210. In addition, the bypass valve 200 according to this second embodiment includes two side mounts 216 that attach to the sides of the housing 210 by means of applicable fasteners such as screws 218 (as shown in the figures), bolts, magnets, etc.

Figure 13:
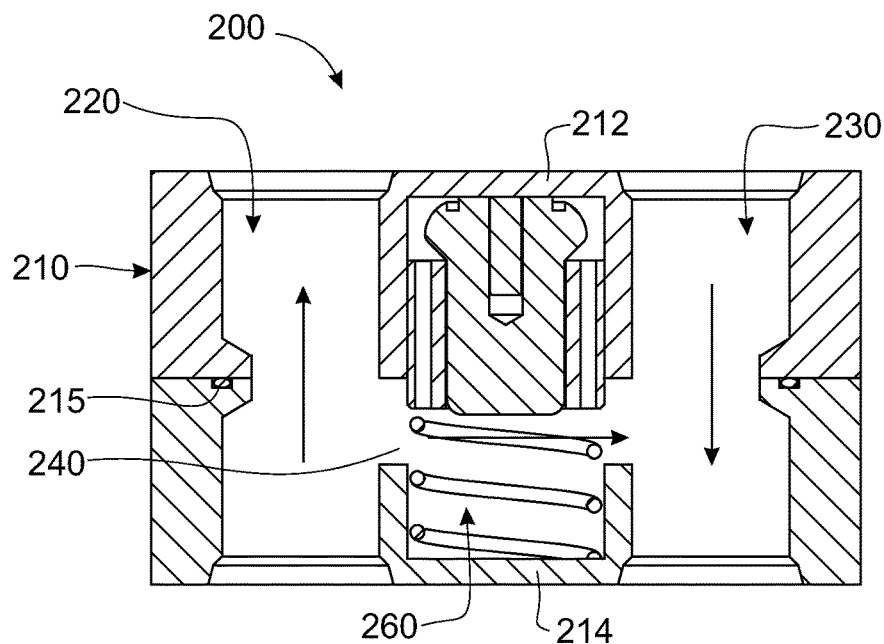
FIG. 13 presents a cross-sectional view of the bypass valve of FIG. 9, according to sectional plane 13-13 indicated in FIG. 11, the bypass valve being shown in an open position.
Figure 14:
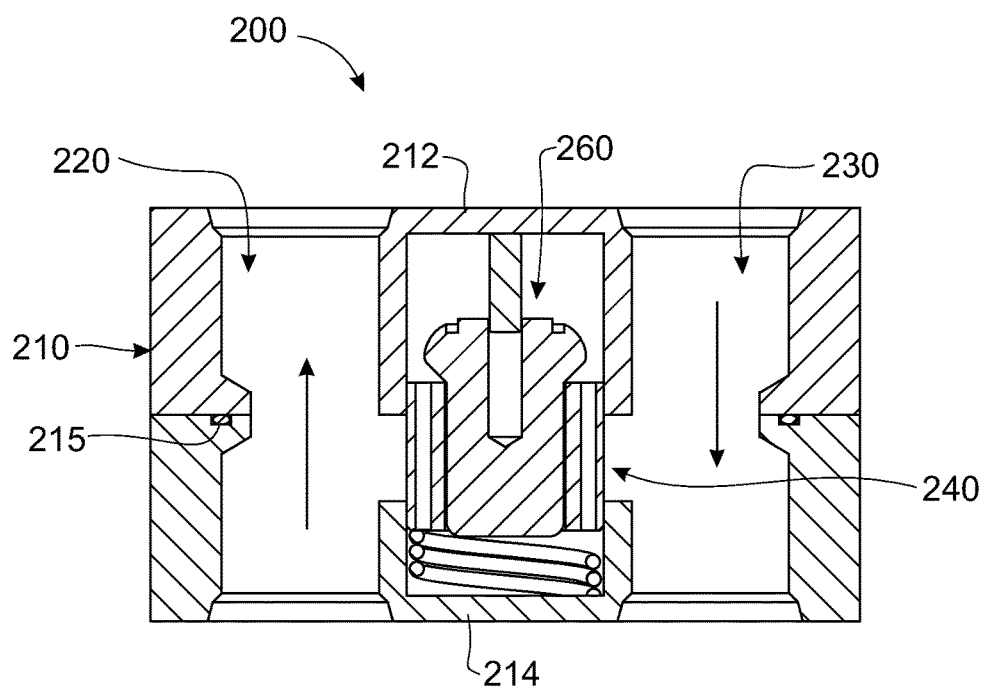
FIG. 14 presents the bypass valve of FIG. 13 in a closed position.
Figure 15:
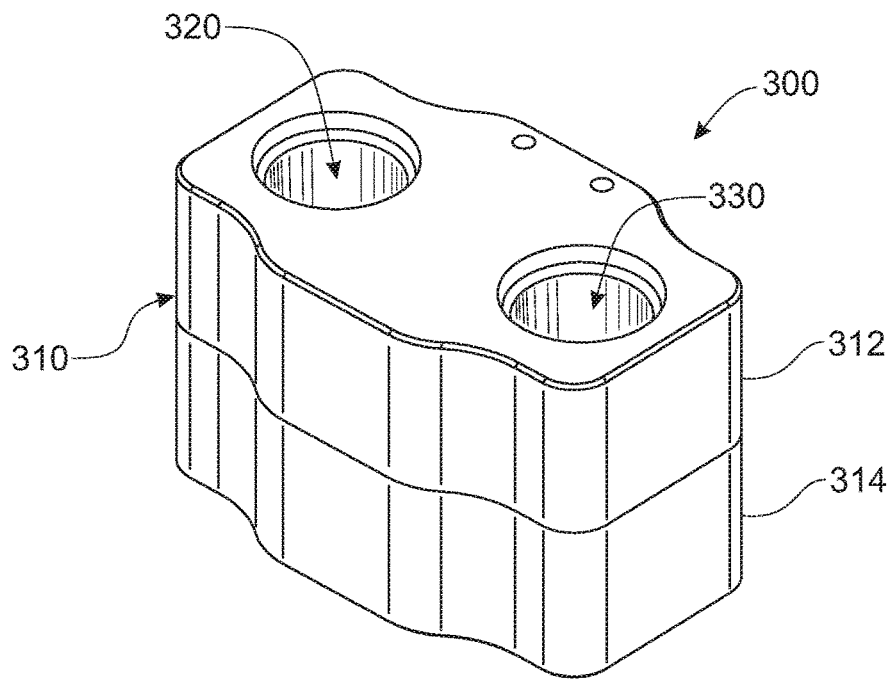
FIG. 15 presents a top isometric view of an alternate embodiment bypass valve.
Figure 16:
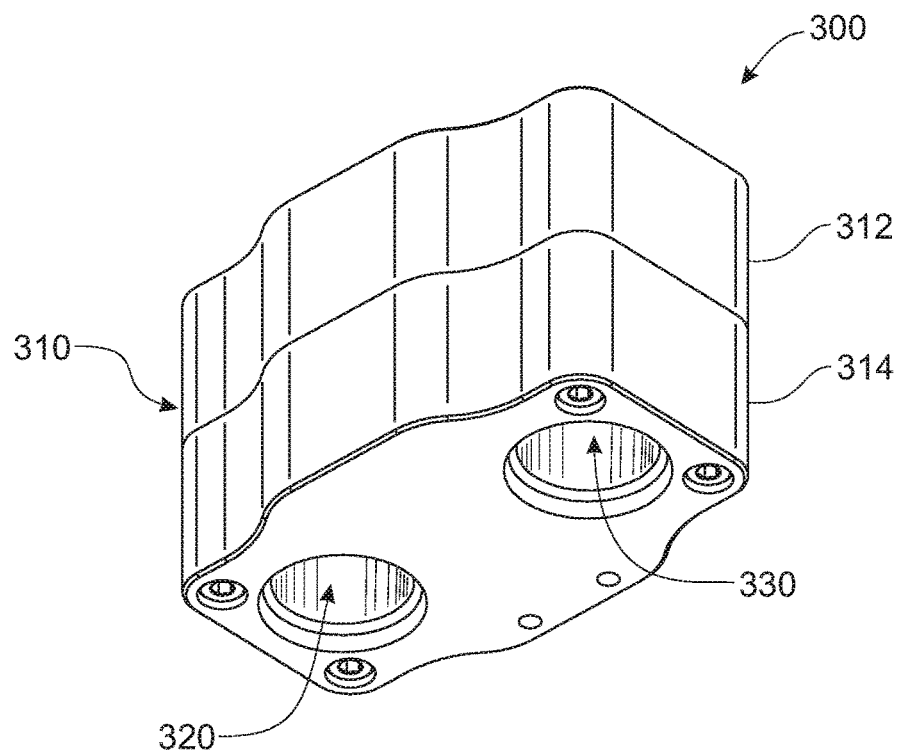
FIG. 16 presents a bottom isometric view of the bypass valve of FIG. 15.
Figure 17:
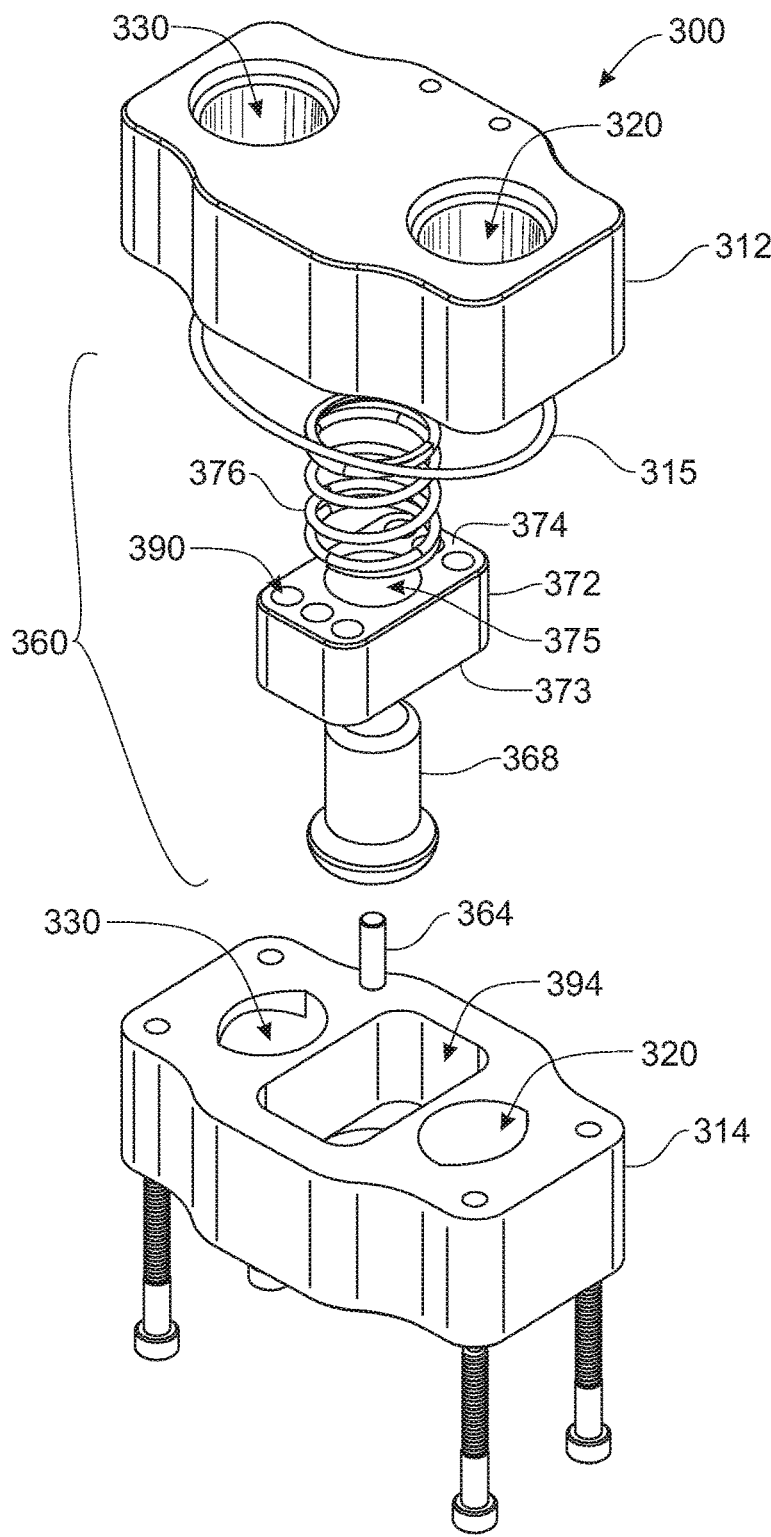
FIG. 17 presents a top inverted isometric exploded view of the alternate embodiment bypass valve.
Figure 18:
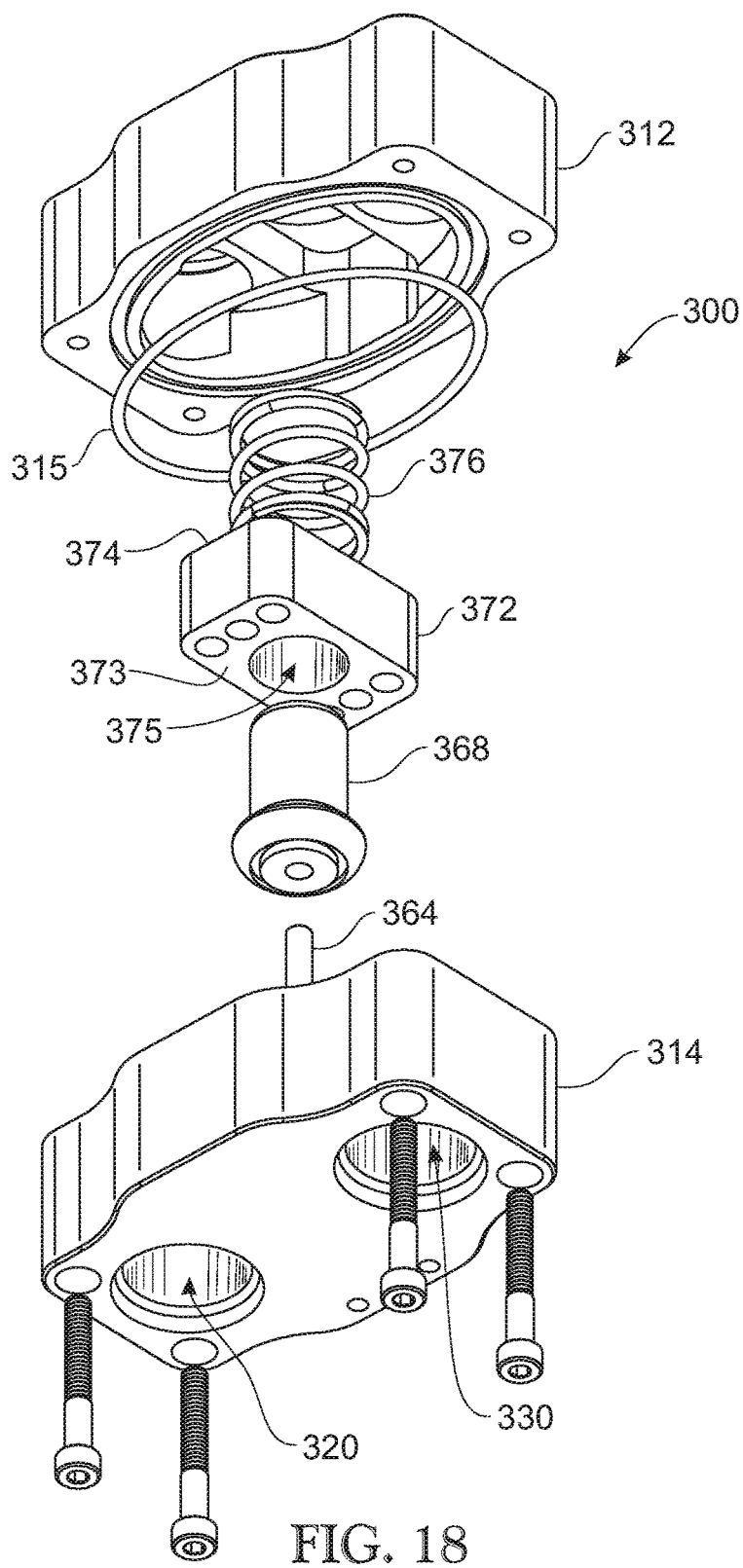
FIG. 18 presents a bottom inverted isometric exploded view of the alternate embodiment bypass valve.

The bypass valve 200 of the present embodiment is shown in the open position and closed position in FIGS. 13 and 14, respectively. This second embodiment works essentially in the same way as the previous embodiment of FIGS. 7 and 8, by having a barrier assembly 260 movably arranged inside the housing and capable of allowing or preventing fluid flow through a bypass port 240 that communicates the first and second ports 220, 230. As in the previous embodiment, the barrier assembly 260 is movably arranged externally to the first port 220 and second port 230. This second embodiment is different in that, as shown, the barrier assembly 260 is secured between the first and second portions 212, 214 of the housing 210.

The invention contemplates the use of alternative barrier assemblies to the barrier assemblies 160, 260 shown in the figures. For instance, the barrier assembly can be an electric barrier assembly, a solenoid, a hydraulic barrier assembly, a pneumatic barrier assembly, a manually-operated barrier assembly, etc. In some embodiments, it could be that a spring were not necessary, for instance in the event that the barrier assembly is electrically-operated by a reversible motor.

Figure 19:
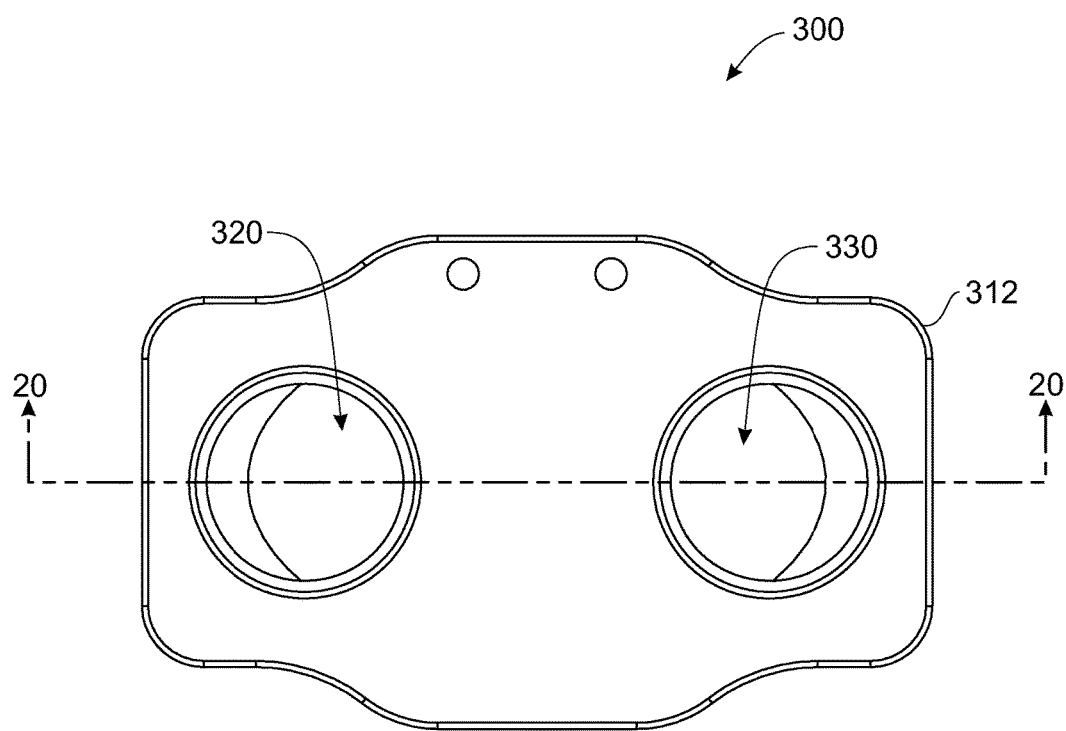
FIG. 19 presents a top plan view of the alternate embodiment bypass valve.
Figure 20:
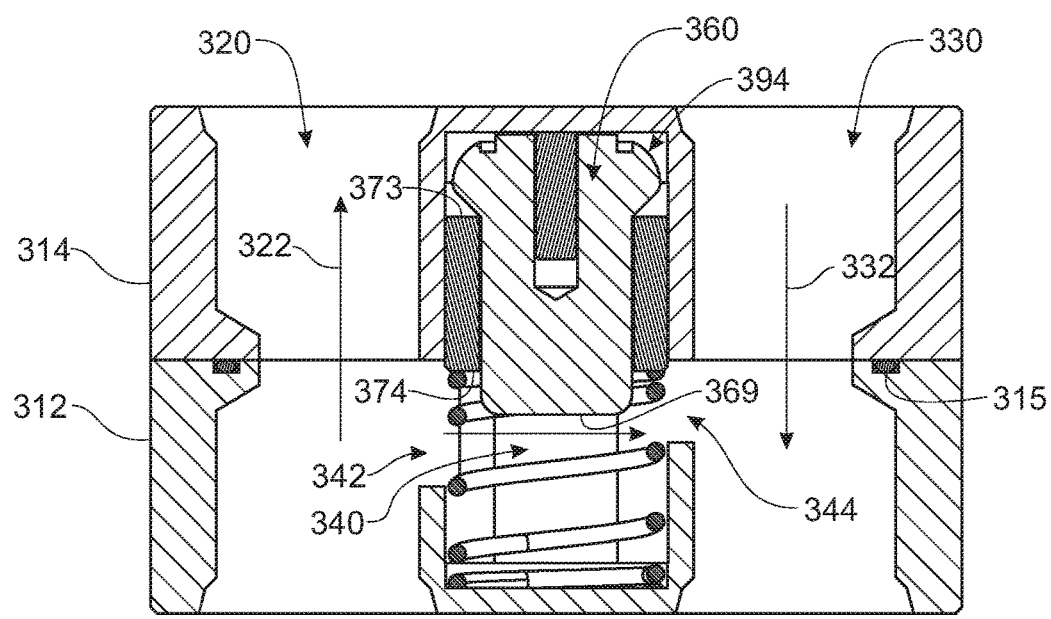
FIG. 20 presents a cross-sectional view of the alternate embodiment bypass valve taken along the line 20-20 of FIG. 19 and illustrating the alternate embodiment bypass valve in an open position.
Figure 21:
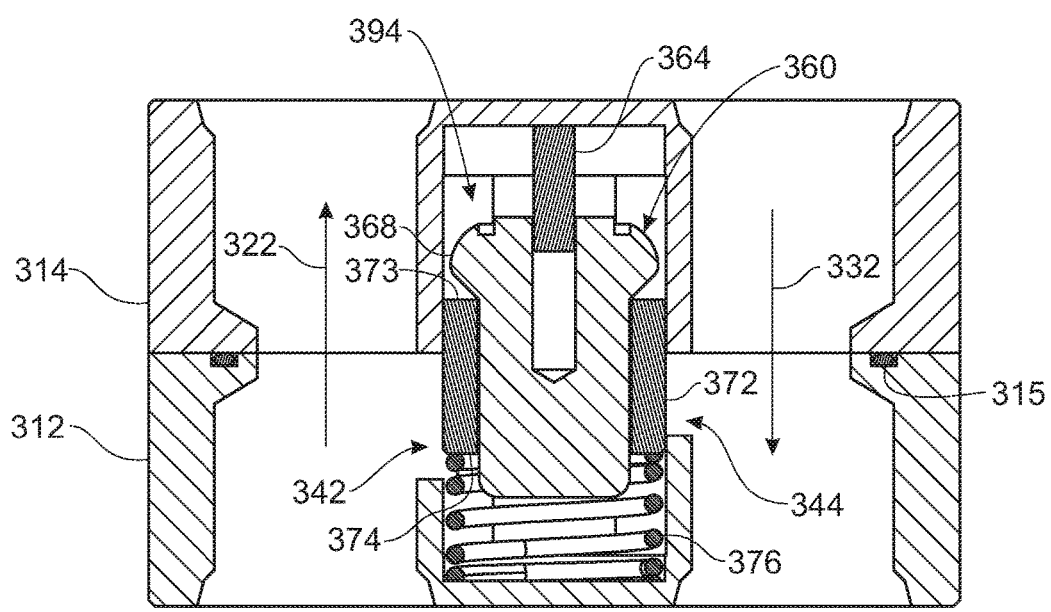
FIG. 21 presents the cross-sectional view of FIG. 20 wherein the alternate embodiment bypass valve is in a closed position.

Referring now to FIGS. 15 through 21, an alternate embodiment bypass valve 300 is illustrated showing its various elements and components. As is illustrated in FIGS. 15 through 18, the bypass valve 300 includes a two-part housing 310 comprising a first portion 312 and a second portion 314. The housing 310 defines a first port 320 extending vertically therethrough for accommodating fluid flow in a first direction 322 and a second port 330 laterally separated from first port 320 and also extending vertically therethrough for accommodating fluid flow in a second direction 332. To prevent leakage of fluid from the mating surfaces of the first portion 312 and the second portion 314, an O-ring 315 (best shown in FIGS. 17, 18, 20 and 21) is seated between the first portion 312 and the second portion 314. As shown in FIGS. 20 and 21, the housing 310 further defines a bypass chamber 394 between the first port 320 and the second port 330. A bypass port 340 extends from the first port 320 to the second port 330 such that the first port 320 is fluidly communicable with the second port 330. The bypass port 340 has a bypass inlet 342 at the first port 320 and a bypass outlet 344 at the second port 330. The bypass inlet 342 has a cross-sectional area which is greater than the bypass outlet 344.

A barrier assembly 360 is operably disposed in the bypass chamber 394 defined by housing 310. The barrier assembly 360 includes a linear thermal actuator element 368 having an actuator pin 364 having one end bearing upon the second portion 314, and wherein the thermal actuator element 368 is responsive to a temperature change of the fluid communicated through bypass port 340 for actuating the barrier assembly between an open and closed position. A barrier 372 is disposed about the periphery of the thermal actuator element 368 and has a cross-sectional geometry only slightly smaller than that of the cross-sectional geometry of the bypass chamber 394, in order for the barrier assembly 360 to be able to slide through the bypass chamber 394 guided by the walls of the bypass chamber 394. The barrier 372 of the present embodiment is generally rectangular, comprising a first end surface 373, an opposed second end surface 374 and a through hole 375, through which the thermal actuator element 368 extends. The barrier 372 can also include one or more conduits 390 extending therethrough to permit the flow of fluid therethrough when the barrier 372 is translated between its open and closed position. The barrier 372 is operable in conjunction with the thermal actuator element 368 to block the bypass outlet 344 of the bypass port 340 when the barrier assembly 360 is in a closed position. A biasing spring 376 is disposed between the barrier 372 and the first portion 312 for biasing the barrier assembly 360 to an open position.

Referring now to FIGS. 19 through 21, the bypass valve 300 works essentially identical to the bypass valves 100, 200 described above. However, as best shown in FIGS. 20 through 21, the bypass inlet 342 is larger than the bypass outlet 344. When the bypass valve 300 is in the open position, as illustrated in FIG. 20, the larger bypass inlet 342 does not restrict fluid flow to the extent that the smaller bypass outlet 344 restricts fluid flow. Thus, there is less of a pressure drop across the bypass port 340. Further, when the bypass valve 300 is in the closed position, as illustrated in FIG. 21, the barrier 372 only seals the outlet port 344 to prevent fluid passage through bypass port 340. However, when the barrier assembly 360 is in its closed position the barrier 372, as a result of the larger bypass inlet 342, fluid from the first port 320 will still remain in contact with the sensing surface 369 of the thermal actuator element 368, ensuring the thermal actuator element 368 is not insulated from the fluid flowing through first port 320 and thus will have a more timely response to a temperature change of the fluid.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A bypass valve for thermally regulating a fluid flow, said bypass valve comprising:
   a first port, configured to at least partially enable a fluid to pass through said valve in a first direction;
   a second port, configured to at least partially enable the fluid to pass through said valve in a second direction;
   a bypass port, extending between said first port and said second port for providing fluid communication between said first port and said second port;

a barrier assembly, adapted to move between an open position and a closed position in response to a variance in the fluid temperature; wherein in said open position, said barrier assembly allows fluid to flow through said bypass port, whereas in said closed position said barrier assembly at least partially inhibits fluid flow through said bypass port; and wherein said barrier assembly is movably arranged externally to said first port and said second port and comprises at least one conduit extending through the barrier assembly to permit fluid to pass from said bypass port to a separate space other than said first port and said second port.

2. The bypass valve according to claim 1, wherein said barrier assembly extends in a perpendicular orientation with respect to said bypass port, moving between said open position and said closed position.

3. The bypass valve according to claim 1, wherein said first port and said second port are parallel to each other.

4. The bypass valve according to claim 1, wherein said barrier assembly is movable in a direction parallel to said first direction and said second direction.

5. The bypass valve according to claim 1, wherein said barrier assembly comprises a linear thermal actuator element, a barrier affixed to said thermal actuator element, and a spring bearing upon said thermal actuator element and biasing said thermal actuator element towards said open position, said thermal actuator element responsive to the fluid temperature for regulating the fluid flow through said bypass port.

6. The bypass valve according to claim 5, wherein said linear thermal actuator element is arranged extending through said barrier such that an end surface of said linear thermal actuator element is in contact with fluid passing through said bypass port when said bypass valve is in said open position, said end surface capable of sensing a change in temperature.

7. The bypass valve according to claim 1, wherein said barrier assembly is arranged at least partially in said separate space, said at least one conduit extending between a first end surface of said barrier assembly that faces said separate space and a second end surface of said barrier assembly opposite to said first end surface, wherein said second end surface is arranged such that said second end surface is inside said bypass port when said valve is in said open position and outside said bypass port when said valve is in said closed position.

8. The bypass valve according to claim 7, wherein said barrier assembly includes an end surface in contact with the fluid passing through said bypass port when said bypass valve is in said open position, said end surface capable of sensing a change in fluid temperature.

9. The bypass valve according to claim 1, wherein said bypass port defines a bypass inlet at said first port and a bypass outlet at said second port wherein said bypass inlet has a cross-sectional area greater than said bypass outlet.

10. The bypass valve according to claim 9, wherein when said bypass valve is in said closed position said barrier blocks said bypass outlet to prevent fluid flow therethrough and only partially blocks said bypass inlet.

11. A bypass valve for thermally regulating a fluid flow, said bypass valve comprising:

a housing comprising a first housing portion sealing affixed to a second housing portion, the first and second housing portions defining:

a first port extending through the first and second housing portions for the passage of a fluid in a first direction, a second port extending through the first and second housing portions and laterally disposed from said first port for the passage of a fluid in a second direction, a bypass chamber isolated from said first port and said second port and enclosed by the first and second housing portions, defining a bypass port extending from said first port to said second port and enclosed by the first and second housing portions, and a barrier assembly enclosed by the first and second housing portions and disposed in said bypass chamber, wherein the barrier assembly comprises a barrier and is operably configured to translate said barrier between an open position and a closed position in response to a temperature change of the fluid; wherein when in said open position, the barrier permits fluid flow between said first port and said second port through said bypass port; and when in said closed position, the barrier blocks fluid flow between said first port and said second port through said bypass port.

12. The bypass valve according to claim 11, wherein said housing further comprises an O-ring seal disposed between the first housing portion and the second housing portion.

13. The bypass valve according to claim 11, wherein said barrier assembly further includes a spring biasing said barrier assembly towards said open position.

14. The bypass valve according to claim 13, wherein said biasing spring is a compression spring.

15. The bypass valve according to claim 11, wherein said barrier assembly further comprises a linear thermal actuator element having a sensor surface and responsive to a temperature change of a fluid in contact with said sensor surface for actuating said barrier assembly to a closed position, and further wherein said barrier is disposed about said linear thermal actuator element.

16. The bypass valve according to claim 11, wherein said bypass port defines a bypass inlet at said first port and a bypass outlet at said second port wherein said bypass inlet has a cross-sectional area greater than said bypass outlet.

17. The bypass valve according to claim 16, wherein when said bypass valve is in said closed position said barrier blocks said bypass outlet to prevent fluid flow therethrough and only partially blocks said bypass inlet.

18. A bypass valve for thermally regulating a fluid flow, said bypass valve comprising:

a housing comprising a first housing portion sealingly affixed to a second housing portion, the first and second housing portions defining:

a first port extending through the first and second housing portions for the passage of a fluid in a first direction, a second port extending through the first and second housing portions and laterally disposed from said first port for the passage of a fluid in a second direction, a bypass chamber isolated from said first port and said second port and enclosed by the first and second housing portions, a bypass port extending from said first port to said second port and enclosed by the first and second housing portions, and a barrier assembly enclosed by the first and second housing portions and disposed in said bypass chamber, wherein the barrier assembly comprises a barrier and is operably configured to translate said barrier between an open position and a closed position in response to a temperature change of the fluid; wherein when in said open position, the barrier permits fluid flow between said first port and said second port through said bypass port; and when in said closed position, the barrier blocks fluid flow between said first port and said second port through said bypass port; and further wherein in both the open position and the closed position, the barrier extends into both the first housing portion and the second housing portion.

19. The bypass valve according to claim 18, wherein said barrier assembly defines at least one conduit therethrough to permit fluid to pass from said bypass port to said bypass chamber.

20. The bypass valve according to claim 18, wherein said barrier assembly is arranged at least partially in said bypass chamber, said at least one conduit extending between a first end surface of said barrier assembly that faces said bypass chamber and a second end surface of said barrier assembly opposite to said first end surface, wherein said second end surface is arranged such that said second end surface is inside said bypass port when said valve is in said open position and outside said bypass port when said valve is in said closed position.

21. The bypass valve according to claim 18, wherein said barrier assembly includes an end surface in contact with the fluid passing through said bypass port when said bypass valve is in said open position, said end surface capable of sensing a change in fluid temperature.

22. The bypass valve according to claim 18, wherein said barrier assembly comprises a linear thermal actuator element, a barrier affixed to said thermal actuator element, and a spring bearing upon said thermal actuator element and biasing said thermal actuator element towards said open position, said thermal actuator element responsive to the fluid temperature for regulating the fluid flow through said bypass port.

* * * * *